May 9, 1939.  P. F. ROSSMANN  2,157,499
MOTOR VEHICLE
Filed April 3, 1936  2 Sheets-Sheet 1
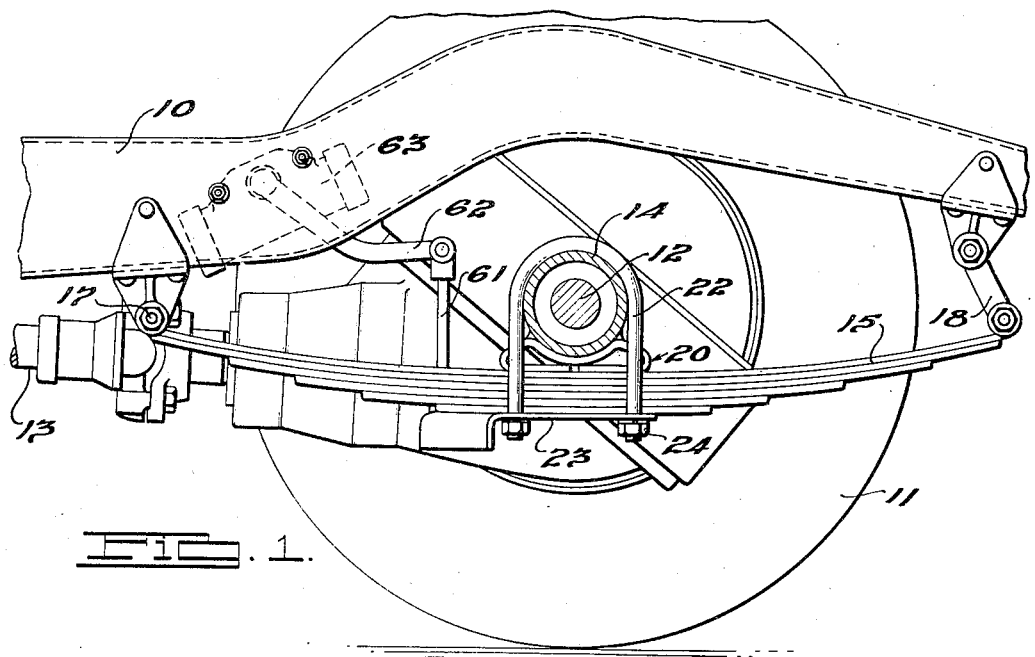
Inventor
Peter F. Rossmann
By Tibbetts & Hart
Attorneys.

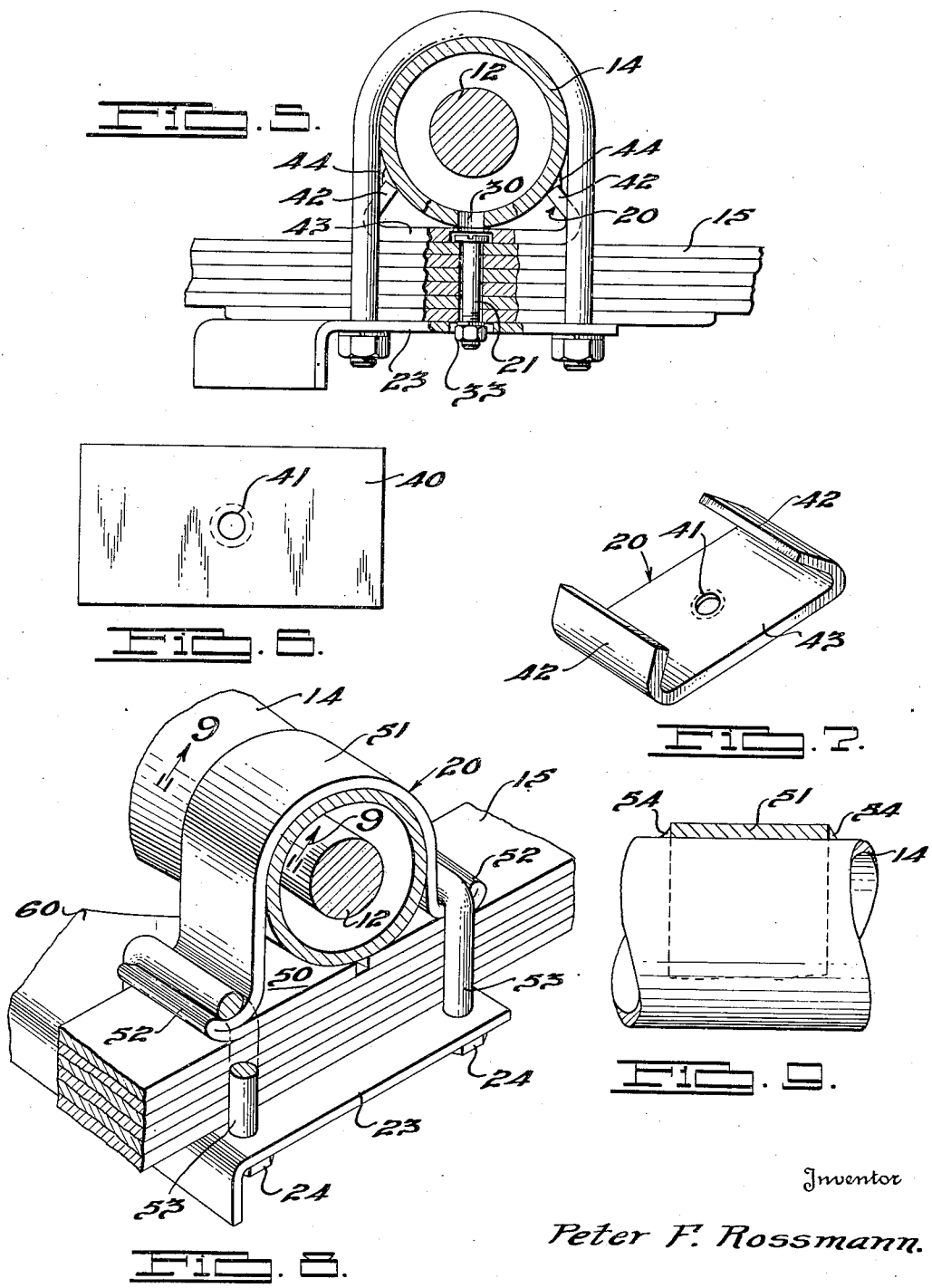

Patented May 9, 1939

2,157,499

UNITED STATES PATENT OFFICE 2,157,499

MOTOR VEHICLE

Peter F. Rossmann, Detroit, Mich., assignor to Packard Motor Car Company, Detroit, Mich., a corporation of Michigan Application April 3, 1936, Serial No. 72,546

6 Claims. (Cl. 267—52)

This invention relates to motor vehicles and particularly to connecting means between vehicle springs and a support, such as the axle or the frame.

One of the objects of the invention is the provision of spring securing means which will effectually hold the spring to its support and at the same time be inexpensive to manufacture and assemble.

Another object of the invention is to provide a spring seat between the vehicle axle and spring which is formed as a stamping.

A further object of the invention is to provide a rugged spring seat formed from a single sheet of metal.

Still another object of the invention resides in the provision of means for securing a vehicle spring to an axle housing consisting of a small number of parts which can be manufactured and assembled at a low cost.

Other objects of the invention will appear from the following description taken in connection with the drawings, which form a part of this specification, and in which:

Fig. 1 is a side elevation of the rear end of a motor vehicle having the invention incorporated therewith, certain parts being broken away to show details;

Fig. 2 is an enlarged elevational view of the axle and spring connection shown in Fig. 1;

Fig. 3 is a plan view of the spring seat after the punching and blanking operation;

Fig. 4 is a perspective view of the spring seat removed from the other parts of the connecting means;

Fig. 5 is a view similar to Fig. 2 showing a modified form of axle housing and spring connecting structure;

Fig. 6 is a plan view of the modified spring seat shown in Fig. 5 after the blanking and punching operation;

Fig. 7 is a perspective view of the spring seat shown in Fig. 5;

Fig. 8 is a view similar to Figs. 2 and 5 showing another modified form of structure connecting the axle housing and a spring, and Fig. 9 is a sectional view of the connecting structure taken on line 9—9 of Fig. 8.

Referring now to the drawings by characters of reference, 10 indicates one of the side sills of a vehicle main frame and, rear driving wheels, as indicated at 11, are associated with the frame and are driven by propeller shaft 13 in a conventional manner. The axle is carried by a housing 14 and this housing is connected to a pair of longitudinally extending leaf spring structures, as indicated at 15, arranged one below each frame side sill. The forward ends of the springs are pivotally connected to the adjacent side sill as indicated at 17, and the rear ends of the springs are connected to the adjacent side sill by shackles as indicated at 18.

This invention relates to the connecting means between the axle housing and each spring structure, and as each of such connections are similar, only one of them is shown and described. In the preferred form of the invention, as shown in Figs. 1 to 4 inclusive, there is a seat member indicated generally at 20 piloted on the spring 15 by a bolt 21, such bolt also serving to hold the leaves of the spring together. U-bolts 22 extend over the axle housing, one at each side of the seat member, and their legs extend down beside the spring sides and pass through openings in an anchor member in the form of a plate 23. The nuts 24 are screwed upon the ends of the U-bolt legs projecting through the plate. The seat member is substantially the same width as the spring and the adjacent legs of the U-bolts assist the bolt 21 in maintaining the seat member in desired position on the spring.

The seat member and the anchor plate are formed of sheet metal and preferably as stampings. The first operation in stamping the seat member consists in blanking and punching a sheet of metal to form a blank as shown at 25, Fig. 3, the outline and recesses 26 and a hole 27 being formed in the blank during this operation. In the second operation, in which the blank is formed into a seat member 20, as shown in Fig. 4, the end portions 28 of the blank are bent under so that they are in alignment and in spaced relation thus forming a flat base portion which is adapted to seat on the upper leaf of the vehicle spring. The intermediate portion of the blank is bent to form a saddle 29 for receiving axle housing and the central portion of this saddle rests upon the base with the recess 27 overlying the space bounded by the recessed ends of the base. The portions 29' of the blank between the saddle and the base extend upwardly and toward each other. The seat member thus formed is provided with a base portion and a loop portion above the base portion which forms a saddle conforming in shape to a portion of the axle housing which is adapted to rest therein.

When connecting the axle housing with the spring structure, the spring seat member is preferably first fixed to the axle housing by placing its saddle portion thereaginst and then driving a dowel pin 30 into the hole 27 and a hole 31 suitably arranged in the axle housing. The saddle portion of the spring seat, after being thus properly positioned, is fixed to the housing in a suitable manner, such as by welding as indicated at 32. The attached seat member is then placed with its base at the top leaf of the spring so that the head of the bolt 21 pilots in the space between the end base recesses 26. The U-bolts are next applied over the housing and through the opening in the anchor member and the nuts 24 are thereafter screwed upon the projected ends of the bolt means. These nuts are tightened up to pull the axle toward the spring structure and thereby clamp the axle and its seat member upon the spring. The nut 33 on the lower end of the bolt 21 pilots in a hole 34 provided in the anchor member and this arrangement assists in locating the anchor plate with respect to the spring.

It will be seen that this connecting means between the axle housing and the spring forms a rugged securement composed of a small number of parts which together with stamping the seat member permit the structure to be manufactured and assembled at a low cost.

In Figs. 5 to 7 inclusive of the drawings is illustrated a modified form of the connecting means between the axle housing and the spring structure. This form of the invention differs from the preferred form only in the construction and formation of the seat member and its connection with the axle housing.

The first operation in stamping this seat member consists in blanking and punching sheet metal forming the blank 40 shown in Fig. 6, such blank being rectangular in outline and having a two diameter hole 41 provided in the central portion thereof. In the second operation, in which the blank is formed into the seat member 20 as shown in Fig. 7, the end portions 42 of the blank are bent upwardly and the intermediate portion 43 is left flat to form a base portion. The ends of the bent up portions of this seat member provide a saddle upon which the axle housing rests and such engaging surfaces are welded together as indicated at 44 in Fig. 5. This form of the connecting means is otherwise assembled in the same manner as previously described except that the hole 41 receives both the dowel pin 30 and the head of the spring bolt 21.

The modified form of the connecting means between the axle housing and the spring structure shown in Figs. 8 and 9 differs somewhat from the previously described embodiments of the invention. In this embodiment, the seat member 20 is preferably a sheet metal stamping having the end portions 50 spaced and in aligned relation to form a base which is adapted to rest on the upper leaf of the vehicle spring. This seat member is also of substantially the same width as the spring leaves. The intermediate portion of the seat member is bent to form a loop 51 which when assembled extends over the axle housing and holds it against the base of the spring member. Between the base and the loop portions of this seat member are doubled portions 52 which are curled upwardly at the ends of the base to provide seats over which the U-bolts 53 extend.

The loop portion of this form of the invention is fixed to the axle housing, preferably by welding as indicated at 54 in Fig. 9. The legs of the U-bolts extend beside the spring and project through an anchor plate 23 as previously described in the other embodiments of the invention. In this instance, the U-bolts engage over the seat portions 52 of the seat member to hold the same upon the spring when the nuts 24 are screwed up.

In all of the forms of the invention herein described the anchor plate 23 is formed with an extension 60 which projects inwardly of the vehicle and serves as an anchor for a rod 61. This rod together with a link 62 pivoted thereto forms a connection between the piston of a hydraulic shock absorber 63 and the anchor plate. The shock absorber housing is fastened to the side sill of the main frame. This stamping 23 therefore serves as a part of the connecting means between the spring and the axle housing and at the same time serves as an anchor for the connecting means between the shock absorber on the main frame and the spring structure.

It will be seen that the connecting structures between the axle housing and the vehicle spring are rugged and comprised of few parts which can be fabricated at low cost and readily assembled. Forming the seat member as a stamping materially assists in low cost fabrication of such connecting structures.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a connecting structure for an axle housing and a spring, a seat member formed of a sheet of metal bent to provide end portions with similar faces aligned to provide a flat base, and an intermediate portion looped above the base, said looped portion being reversely bent to form a seat.

2. A connecting structure for the axle housing and the spring of a vehicle comprising a bent sheet metal seat member having the end portions forming a base for resting on the spring and the intermediate portion extending above the base and forming an axle housing seat, means fixing the seat portion of the member to the axle housing, and means fixing the seat member on the spring.

3. A seat member for a vehicle spring and axle housing connection comprising a sheet metal blank having the end portions bent into alignment with the ends in spaced adjacent relation to form a base, the portions adjacent the end portions extending upwardly at similar but opposite angles and a saddle portion intermediate the upwardly extending portions depressed to conform to a portion of the outline of the axle housing.

4. In a connecting structure for an axle housing and a spring of a vehicle, a seat member comprising a continuous sheet of metal bent to provide similar ends forming a base portion and an intermediate portion looped from the base portion.

5. A connecting structure for the axle housing and the spring of a vehicle comprising a bent sheet metal seat member having the end portions thereof forming a base for resting on the spring and the intermediate portion looped above the base with a reverse curved seat portion for receiving the axle housing, means fixing the housing to the seat portion of the member, and means fixing the seat member on the spring.

6. A connecting structure for the axle housing and the spring of a vehicle comprising a bent sheet metal seat member having the end portions forming a base for resting on the spring and the intermediate portion looped above the base sufficiently to encircle the axle housing, means fixing the looped portion of the member with the axle housing, and means fixing the seat member on the spring.

PETER F. ROSSMANN.